Aug. 7, 1951     C. R. MOREHOUSE ET AL     2,563,183
PUDDLER
Filed Dec. 17, 1946     4 Sheets-Sheet 1
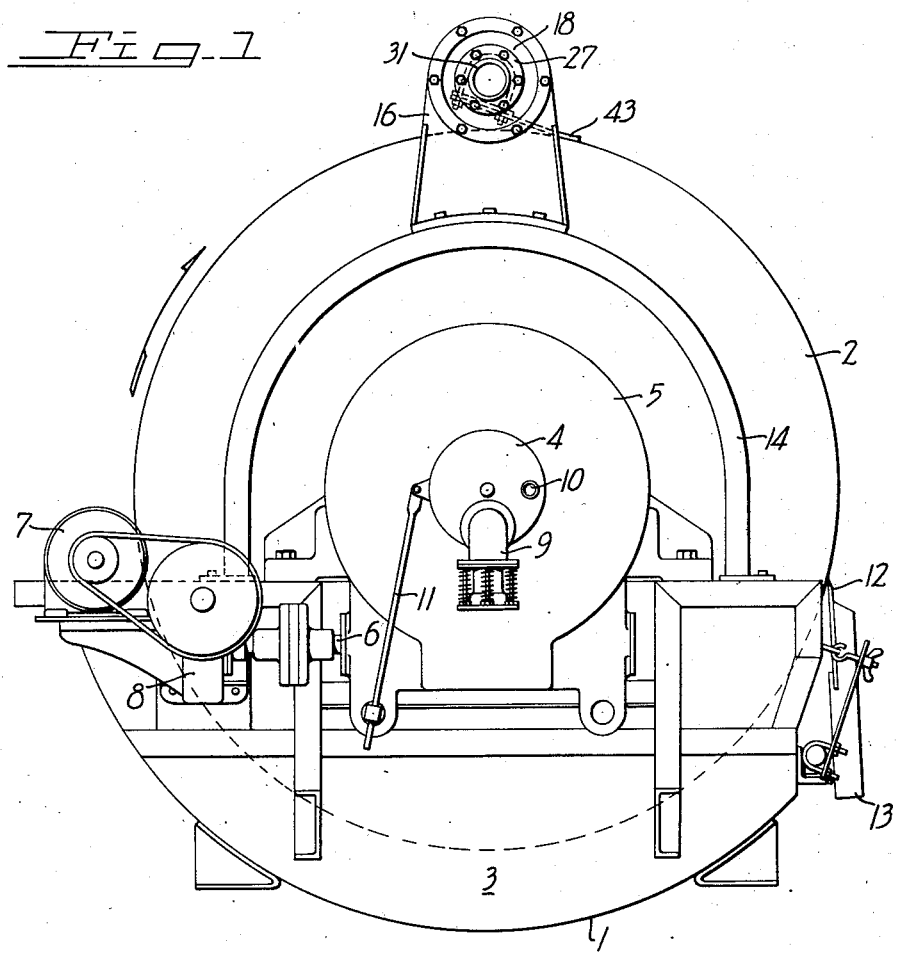
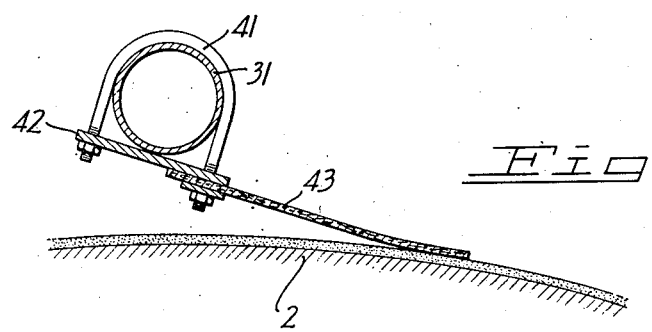
INVENTORS
CHARLES R. MOREHOUSE
JOSEPH T. CAVALLERO
BY *Mellin and Hanson*
Their Attorneys

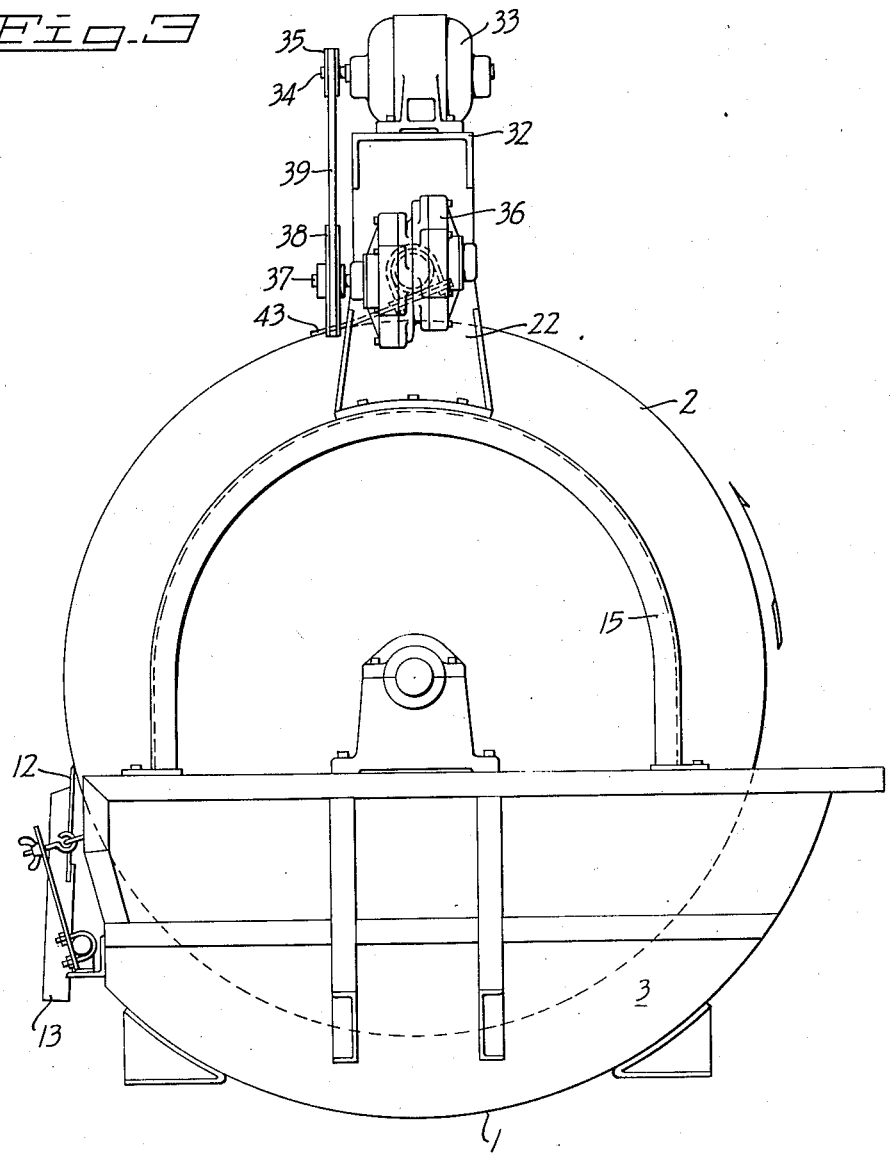

Aug. 7, 1951 C. R. MOREHOUSE ET AL 2,563,183
PUDDLER
Filed Dec. 17, 1946 4 Sheets-Sheet 3

INVENTORS
CHARLES R. MOREHOUSE
JOSEPH T. CAVALLERO
BY
Their Attorneys

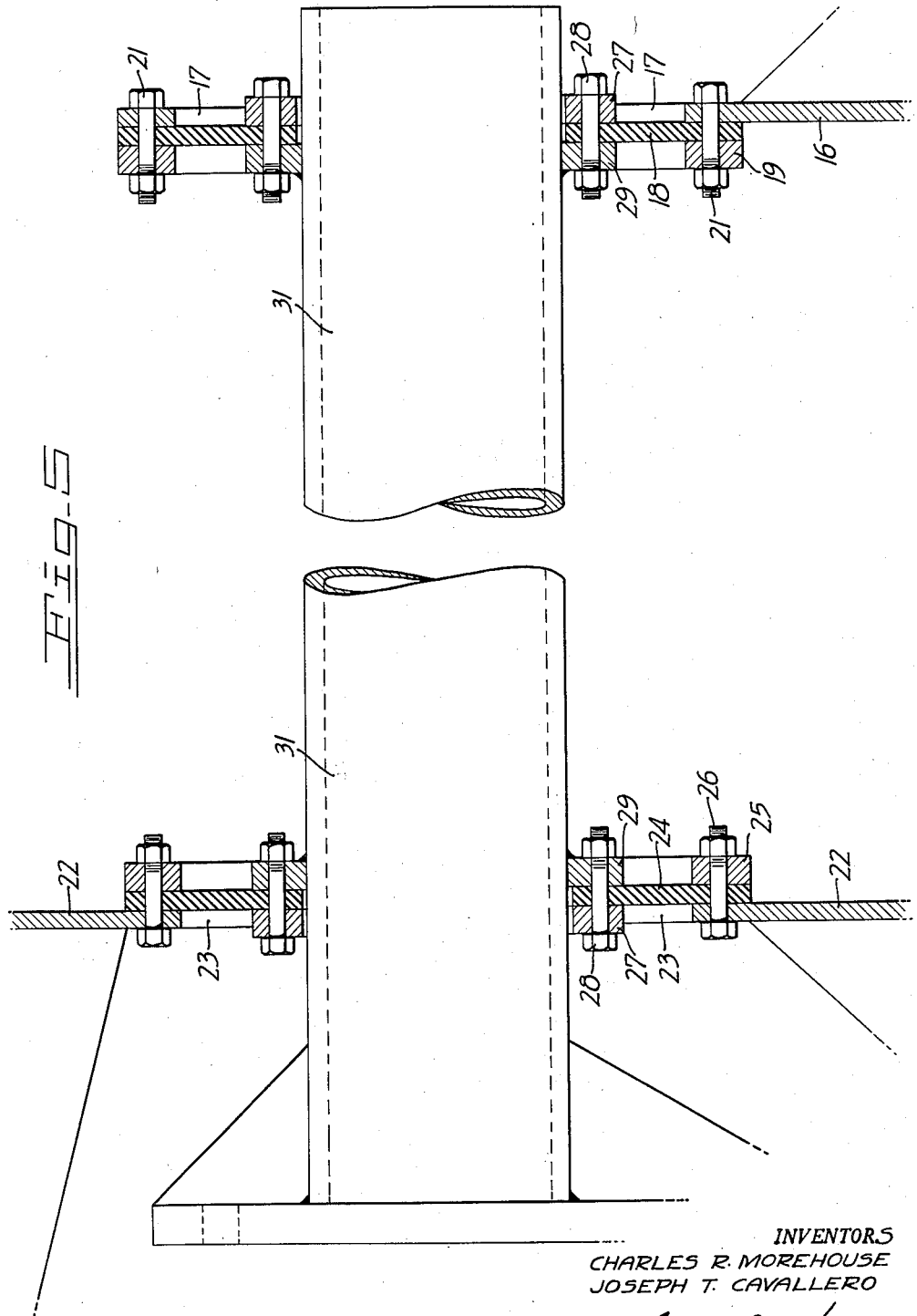

Patented Aug. 7, 1951

2,563,183

UNITED STATES PATENT OFFICE 2,563,183

PUDDLER

Charles R. Morehouse, Berkeley, and Joseph T. Cavallero, Walnut Creek, Calif., assignors to Oliver United Filters Incorporated, Oakland, Calif., a corporation of Nevada Application December 17, 1946, Serial No. 716,856

8 Claims. (Cl. 210—199)

This invention relates in general to continuous industrial filters and more particularly to filters of this type provided with vibrators for puddling the cake formed and carried thereon, such as shown in the Stanley Patent No. 2,377,189 of May 29, 1945.

Although basically the function of all filters is to effect a separation of solids and liquids, some filters are particularly designed to produce a cake having a lower moisture content than can normally be obtained by merely resorting to the application of a differential filtering pressure. The reason for this is that, in some instances, the cake discharged from the filter is immediately passed through a dryer to free it of substantially all moisture, and the less moisture that is present in the cake discharged from the filter, the less load will be placed on the dryer. From a practical standpoint, however, the application of attachments to a filter for producing a cake having a moisture content lower than that normally obtained, is justified only if the cost involved in resorting to this expedient is less than the cost involved in reducing the additional moisture content by means of the dryer.

The solids here being dealt with are of a thixotropic character wherein moisture is held within its interstitial spaces by adhesion or capillary attraction, and wherein at least a part of this moisture can be brought to the surface by vibrating the solids so as to cause a rearrangement of the solid particles, and thereby effect a decrease of the adhesion or capillary attraction between the entrained moisture and the solid particles.

Although the transversely vibrating puddler disclosed in the Stanley patent has been found to be very effective, the vibrations of the puddler are transmitted to its mountings to such an extent that sometimes breakage occurs, thereby necessitating shutting down the filter for repairs.

In general the object of this invention is the provision of an improved mounting for the type of vibrator shown in the Stanley patent, of such construction that breakage will not occur and that substantially no vibrations will be transmitted to the filter tank on which it is supported.

More specifically, the object of this invention is the provision in a continuous filter of a transversely vibrated shoe and vibrator suspended or supported by a filter tank or other structure by means of a pair of elastomer diaphragms.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

Referring to the drawings:

Fig. 1 is a valve-end elevation of a continuous rotary drum filter embodying the objects of our invention.

Fig. 2 is an enlarged fragmentary section taken on the section line 2—2 of Fig. 4.

Fig. 3 is an elevation of the filter shown in Fig. 1, illustrating the end opposite that shown in Fig. 1.

Fig. 5 is an enlarged vertical section taken through the vibrating shoe supporting beam and its diaphragm suspensions.

Figure 4:
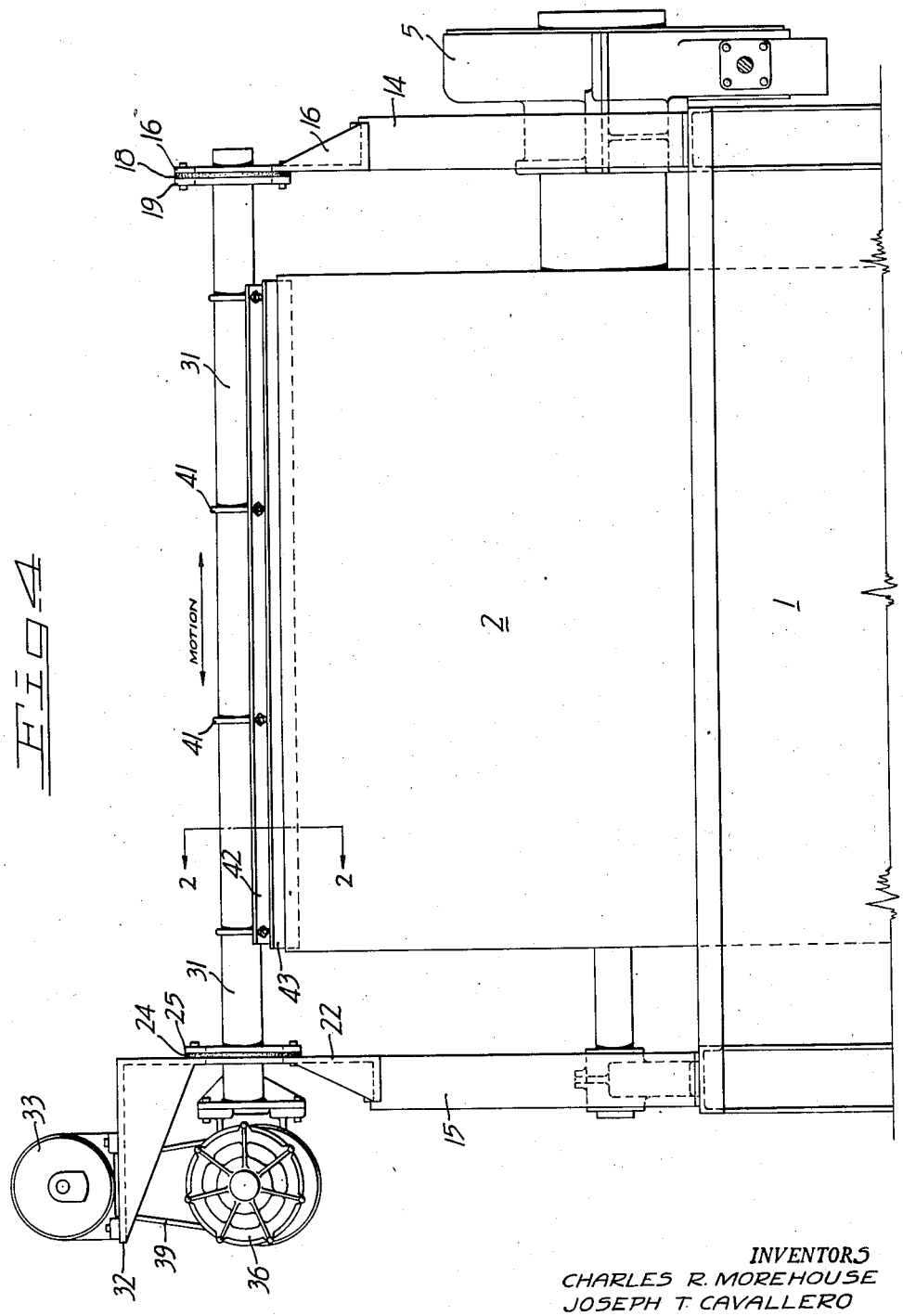
Fig. 4 is a side elevation of the filter shown in Fig. 1 as viewed on the rising side of the drum.

As shown in these figures, the objects of our invention have been embodied in a continuous rotary drum filter such as manufactured by Oliver United Filters Incorporated. In accordance with standard practice, this type of filter comprises a tank 1, within which is arranged to rotate a filter drum 2, supported at either end by trunnions journaled in bearings associated with the tank heads 3. The peripheral surface of the drum is divided by division strips into a plurality of longitudinally extending filtrate compartments communicating through suitable conduits with an automatic valve 4 associated with the end of one of the drum trunnions. Rotation is imparted to the drum through a ring gear carried by one of the drum trunnions, and disposed within the gear housing 5. Meshed with this ring gear is a worm gear carried by the shaft 6, driven by a motor 7 through a speed reducer 8. The automatic valve 4 may be of the type disclosed in the Oliver Patent No. 919,628, of April 27, 1909, and is provided with a vacuum connection 9, and with a blow-back connection 10, and with suitable bridges, whereby any one of the filtrate compartments formed on the periphery of the drum may be successively subjected to a vacuum or reverse pressure. For the purpose of adjusting the entire cycle of operation, the valve 4 may be rotated through a predetermined angle and held at any desired angle by an adjusting rod 11. Mounted on the tank 1, adjacent the drum 2 on the descending side thereof, is a scraper or doctor 12, and a cake deflector 13.

As already stated, the filter above described is of standard construction, operating in accordance with standard practice. The pulp or slurry to be filtered is continuously fed to the tank 1, in which the drum 2 continuously rotates. As each filtrate compartment of the drum is submerged in the pulp or slurry, it is subjected by means of the automatic valve 4 to a differential filtering pressure, resulting in the deposition on the filter medium carried by the drum of a deposit of solids. As each section emerges from the tank, the cake carried thereon may be subjected to a displacement wash, and partially dried by pulling air, either hot or cold, therethrough by means of the automative valve. Upon reaching the doctor 12, a reverse pressure or blow-back is applied to the cake in order to aid the doctor in discharging the cake from the filter drum.

For the purpose of further reducing the moisture content of the cake deposited on and carried by the filter drum 2 prior to the removal of the cake by the doctor 12, the filter is provided with a puddling device comprising an arch 14, secured to the tank head 3 on the valve end of the filter drum, and an arch 15, secured to the tank head 3 of the opposite end of the tank.

Bolted to the arch 14 is a bracket 16 provided at its upper end with a circular opening 17. Disposed over the opening 17 on the inner face of the bracket 16 is an annular ring 18 of rubber or other suitable elastomer, this ring being fastened to the bracket 16 by a clamping ring 19 and bolts 21.

Bolted to the arch 15 is a bracket 22 which, like the bracket 16, is provided at its upper end with a circular opening 23. Disposed over the opening 23 is an annular ring 24 of rubber or other suitable elastomer, this ring being fastened to the bracket 22 by a clamping ring 25 and bolts 26.

Fastened to the inner peripheral edge of each of the rings 18 and 24 by means of clamping rings 27 and bolts 28 is an annular metal ring 29. Welded to each of the opposed rings 29 is a vibrating shoe-supporting beam 31, the ends of which extend through the clamping rings 27 with substantial clearance.

The upper end of the bracket 22 is provided with a platform 32 and mounted thereon is an electric motor 33 including a shaft 34 to which is keyed a pulley 35.

Welded to the left end of the beam 31 as viewed in Fig. 4 is a vibrator 36 which may be of any standard make. Vibrators of this type consist basically of two offset weights mounted on shafts geared together, so that when one shaft is rotated the other must also rotate at the same speed, but in the opposite direction. Twice in each revolution the two weights are pulled in the same direction, and twice they are opposed, with the result that the centrifugal forces generated are balanced just half of each cycle. When the weights are rotated, the housing in which they are mounted travels back and forth in the plane in which the weights pass each other.

The vibrator 36 includes a drive-shaft 37, to which is keyed a pulley wheel 38 in vertical alignment with the pulley 35 of the motor 33 and driven thereby through a conventional belt 39. As described in the Stanley patent, the vibrator 36 is so positioned that when in operation it causes the tubular beam 31 to vibrate along its own axis, this movement being possible due to the fact that the beam is supported by the elastomer diaphragms 18 and 24.

Fastened to the beam 31 by eye-bolts 41 and a clamping plate 42 is a panel, strip or shoe 43 of rubber or other suitable elastomer, arranged to contact the cake formed on the filter drum 2 on the descending side thereof, and which serves to puddle the cake.

Although the vibrator 36 is driven by the motor 33 through the belt 39, substantially none of the vibrations of the vibrator 36 are transmitted to the motor or through the motor and the bracket 22 to the tank for, as above explained, the movement of the vibrator is along the axis of the beam 31 and is substantially free of any vertical component. The belt 39 permits the vibrator to move along a transverse axis without imparting any of its movement to the motor.

The diaphragms or annular elastomer rings 18 and 24 serve as floating suspensions for the beam 31 and adequately absorb all of the vibrations of the beam so that such vibrations are not transmitted to the brackets 16 and 22 on which they are mounted.

As a result of tests of this mounting made on the test stand over a considerable period of time it has been found that this type of mounting has an indefinite life, avoids formation of minute fractures in the superstructure on which it is mounted, and consequently avoids unnecessary shut-downs of its associated filter.

We claim:

1. A device for puddling the cake formed and carried on an endless traveling filtering medium comprising: a pair of opposed upstanding brackets mounted on either side of said filtering medium, each of said brackets being provided with an opening therein in horizontal alignment with the opening in the opposed bracket; an annular elastomer diaphragm fastened to each of said brackets over the opening therein; a beam supported by and between said diaphragm; a shoe supported by said beam and arranged to rest on said cake; and a motor driven vibrator supported by said shoe.

2. A device for puddling the cake formed and carried on an endless traveling filtering medium comprising: a frame; a pair of spaced elastomer diaphragms supported by said frame; a beam mounted on said diaphragms over said filtering medium; a shoe fastened to said beam and arranged to ride on said cake; and a motor driven vibrator fastened to said beam.

3. In a continuous rotary drum filter including a tank and a filter drum arranged to rotate within said tank, a puddler for puddling the cake formed and carried by said drum comprising: upstanding frame members supported by the ends of said tank; elastomer diaphragms mounted on said frame members; a beam supported by said diaphragms across the face of said drum; and a motor driven vibrator fastened to said beam.

4. A device for puddling the cake formed and carried on an endless traveling filtering medium comprising: a pair of opposed upstanding frame members disposed on either side of the path of travel of said filtering medium; a vertically disposed elastomer diaphragm supported by each of said frame members; a beam supported by and between said elastomer diaphragm; a shoe suspended from said beam over said filtering medium and arranged to rest on said cake; and means for vibrating said beam about its axis.

5. A device for puddling the cake formed and carried on an endless traveling filtering medium comprising: a pair of opposed upstanding frame members disposed on either side of the path of travel of said filtering medium; a vertically disposed elastomer diaphragm supported by each of said frame members; a beam supported by and between said elastomer diaphragm; a shoe suspended from said beam over said filtering medium and arranged to rest on said cake; a vibrator mounted on said beam; and means for actuating said vibrator.

6. A device for puddling the cake formed and carried on an endless traveling filtering medium comprising: a pair of opposed upstanding frame members disposed on either side of the path of travel of said filtering medium; a vartically disposed elastomer diaphragm supported by each of said frame members; a beam supported by and between said elastomer diaphragms; a shoe suspended from said beam over said filtering medium and arranged to rest on said cake; a vibrator mounted on one end of said beam; a motor mounted on one of said frame members adjacent said vibrator; and means for actuating said vibrator from said motor.

7. A device for puddling the cake formed and carried on an endless traveling filtering medium comprising: opposed upstanding frame members disposed on either side of the path of travel of said filtering medium; a vertically disposed elastomer diaphragm supported by each of said frame members; a beam supported by and between said elastomer diaphragms with one end of said beam extending through one of said diaphragms; a vibrator mounted on the last mentioned end of said beam; a motor mounted on one of said frame members adjacent said vibrator; means for driving said vibrator from said motor; and a shoe suspended from said beam over said filtering medium and arranged to rest on said cake.

8. A device for puddling the cake formed and carried on an endless traveling filtering medium comprising: a pair of upstanding frame members mounted on either side of said filtering medium, said frame members being provided with opposed, horizontally aligned openings; an elastomer diaphragm fastened to each of said frame members over the opening therein; a beam supported by and between said diaphragm; a shoe supported by said beam and arranged to rest on said cake; and a motor driven vibrator mounted on said beam.

CHARLES R. MOREHOUSE.
JOSEPH T. CAVALLERO.

REFERENCES CITED

The following references are of record in the file of this patent:

UNITED STATES PATENTS

| Number | Name | Date |
|---|---|---|
| 337,050 | De Lisser | Mar. 2, 1886 |
| 2,092,509 | Hampton et al. | Sept. 7, 1937 |
| 2,178,077 | Loftis | Oct. 31, 1939 |
| 2,349,215 | Wahlborg | May 16, 1944 |
| 2,375,635 | Dyer | May 8, 1945 |
| 2,377,189 | Stanley | May 29, 1945 |